United States Patent [19]

Takita et al.

[11] Patent Number: 5,786,396
[45] Date of Patent: Jul. 28, 1998

[54] METHOD OF PRODUCING MICROPOROUS POLYOLEFIN MEMBRANE

[75] Inventors: Kotaro Takita; Koichi Kono; Norimitsu Kaimai, all of Kawasaki, Japan

[73] Assignee: Tonen Chemical Corporation, Tokyo, Japan

[21] Appl. No.: 899,778

[22] Filed: Jul. 24, 1997

[30] Foreign Application Priority Data

Aug. 21, 1996 [JP] Japan ................................. 8-238515

[51] Int. Cl.$^6$ ................................................. C08J 9/28
[52] U.S. Cl. ................. 521/64; 210/500.42; 264/45.9; 521/134; 521/142
[58] Field of Search .................. 264/45.9; 210/500.42; 521/64, 134, 142

[56] References Cited

U.S. PATENT DOCUMENTS

| | | | |
|---|---|---|---|
| 3,954,927 | 5/1976 | Duling et al. | 521/64 |
| 4,237,080 | 12/1980 | Young et al. | 521/64 |
| 4,620,955 | 11/1986 | Kono et al. | 521/54 |
| 4,655,769 | 4/1987 | Zachariades | 54/64 |

*Primary Examiner*—Morton Foelak
*Attorney, Agent, or Firm*—Sughrue, Mion, Zinn, Macpeak & Seas, PLLC

[57] ABSTRACT

A method of producing a microporous polyolefin membrane having a relatively large pore size and a high permeability, the membrane being suitable for use in water treatment, microfiltration, etc. The method comprises dissolving a polyolefin composition in a solvent to prepare a solution, extruding the solution through a die lip into a form of gel-like sheet, rapidly cooling the gel-like sheet, removing a residual solvent in the cooled sheet by a washing solvent, and drying the resultant sheet to remove the washing solvent. The polyolefin composition is a mixture of (A) an ultra high molecular weight polyolefin having a weight average molecular weight of $5\times10^5$ or more and (B) a polyolefin having a weight average molecular weight less than $5\times10^5$, and a weight ratio of (B)/(A) is 0.2 to 20.

5 Claims, No Drawings

METHOD OF PRODUCING MICROPOROUS POLYOLEFIN MEMBRANE

BACKGROUND OF THE INVENTION

The present invention relates to a method of producing a microporous polyolefin membrane comprising a polyolefin composition containing an ultra high molecular weight polyolefin.

Microporous membranes are widely used in various applications such as battery separators, electrolytic capacitor separators, various filters, moisture-permeable and waterproof clothes, reverse osmosis membranes, ultrafiltration membranes, microfiltration membranes, etc.

It has been known in the art that the microporous membrane may be produced by forming a molten mixture of a polyolefin, an organic solvent and an inorganic powder such as a silica fine powder into a sheet, and thereafter extracting the organic solvent and the inorganic powder from the sheet. However, this method requires an additional process of extracting the inorganic powder, and the permeability of the produced membrane is difficult to be regulated in the desired level because the permeability largely depends on the particle size of the inorganic powder.

Various methods of producing a microporous membrane having a high strength from an ultra high molecular weight polyolefin have been proposed in Japanese Patent Laid-Open Nos. 60-242035, 61-195132, 61-195133, 63-39602, 63-273651, etc. In these methods, a solution prepared by dissolving a polyolefin composition containing an ultra high molecular weight polyolefin in a solvent under heating is made into a gel-like sheet, the gel-like sheet is stretched under heating, and then the residual solvent is removed from the stretched sheet by extraction to produce the microporous membrane. The microporous membrane produced by these methods is characterized by a small pore size and a narrow distribution of the pore sizes, and suitable for battery separators, etc. However, a microporous membrane having a relatively large pore size has not been obtained by these methods.

Recently, it has been demanded to provide microporous membranes having different permeability levels to meet various application fields which require different permeability levels. Also, even in the same application field, microporous membranes having different permeability levels has come to be required to enhance a certain property of the membrane. Since a great number of micro pores is formed by the methods known in the art, the resultant membrane has a small pore size and a narrow pore size distribution. Thus, the methods conventional known fail to provide a microporous polyolefin membrane having a relatively large pore size and a high permeability, which is suitable for use in water treatment, microfiltration, etc. Therefore, it has been demanded to provide a method of producing such a microporous membrane as having a relatively large pore size and a high permeability.

OBJECT AND SUMMARY OF THE INVENTION

Accordingly, an object of the present invention is to provide a method of easily and efficiently producing a microporous polyolefin membrane having a relatively large pore size and a high permeability.

As a result of the intense research in view of the above objects, the inventors have found that a membrane having a relatively large pore size and a high permeability can be produced by extruding a solution having a specific concentration of a composition containing a specific amount of an ultra high molecular weight polyolefin into a form of sheet, rapidly cooling the extruded sheet, and removing the residual solvent from the cooled sheet, preferably without stretching. The present invention has been accomplished by the finding.

Thus, in an aspect of the present invention, there is provided a method of producing a microporous polyolefin membrane, which comprises (a) dissolving a polyolefin composition in a solvent to prepare a solution comprising 5 to 35% by weight of the polyolefin composition and 65 to 90% by weight of the solvent, the polyolefin composition being a mixture of (A) an ultra high molecular weight polyolefin having a weight average molecular weight of $5 \times 10^5$ or more and (B) a polyolefin having a weight average molecular weight less than $5 \times 10^5$, and a weight ratio of (B)/(A) being 0.2 to 20; (b) extruding the solution through a die lip into a form of gel-like sheet; (c) rapidly cooling the gel-like sheet immediately after the extruding; (d) removing a residual solvent in the cooled sheet by a washing solvent; and (e) drying the resultant sheet to remove said washing solvent.

DETAILED DESCRIPTION OF THE INVENTION

The present invention will be described below more in detail.

[1] Polyolefin Composition

In the method of the present invention, the microporous polyolefin membrane is produced from a polyolefin composition which is a mixture of (A) an ultra high molecular weight component and (B) a high molecular weight component. The ultra high molecular weight component (A) is at least one ultra high molecular weight polyolefin having a weight average molecular weight of $5 \times 10^5$ or more, preferably $5 \times 10^5$ to $5 \times 10^6$. The high molecular weight component (B) is at least one polyolefin having a weight average molecular weight less than $5 \times 10^5$, preferably $1 \times 10^3$ to less than $5 \times 10^5$. The weight ratio of (B)/(A) in the polyolefin composition is 0.2 to 20, preferably 0.5 to 10. When the weight ratio (B)/(A) is less than 0.2, a gel-like sheet being produced in the production method is likely to shrink in the thickness direction to reduce the permeability of the resulting microporous polyolefin membrane, and additionally, a gel-like sheet-forming process is encountered by several problems such as swell, neck-in, melt fracture, uneven extrusion amount, rough surface of the sheet, etc. due to a high viscosity of a solution of the polyolefin composition. When the weight ratio (B)/(A) is larger than 20, a dense gel structure due to an excess amount of the high molecular weight component (B) reduces the permeability of the resulting microporous membrane. The molecular weight distribution (weight average molecular weight (Mw)/ number average molecular weight (Mn)) of the polyolefin composition is preferably 300 or less, and more preferably 5 to 50. A molecular weight distribution larger than 300 undesirably reduces the permeability of the resulting microporous polyolefin membrane because an excess amount of the high molecular weight component (B) densifies the gel structure of the gel-like sheet.

As the polyolefin for both the ultra high molecular weight component (A) and the high molecular weight component (B), a crystalline homopolymer, a multi-stage polymer or a copolymer of ethylene, propylene, 1-butene, 4-methylpentene-1, 1-hexene, etc. may be used. A blend of the above polymers may be also usable. Of the polyolefins exemplified above, a polypropylene, a polyethylene, in particular, a high density polyethylene or a mixture thereof may be preferable.

The multi-stage polyolefin may be produced by respectively forming the high molecular weight component (B) having a weight average molecular weight less than $5 \times 10^5$ and the ultra high molecular weight component (A) having a ultra high weight average molecular weight of $5 \times 10^5$ or more by a multi-stage polymerization so that the weight ratio of (B)/(A) is 0.2 to 20 and the molecular weight distribution is 300 or less. The multi-stage polymerization is conducted preferably by two-stage polymerization.

The polyolefin composition may be also produced by mixing the ultra high molecular weight polyolefin having a weight average molecular weight of $5 \times 10^5$ or more and a polyolefin having a weight average molecular weight less than $5 \times 10^5$, each is an olefin homopolymer or an olefin copolymer produced separately, so that the molecular weight distribution falls within the above range.

The polyolefin composition may further contain, if desired, additives such as an antioxidant, an ultraviolet absorber, an antiblocking agent, a pigment, a dye, an inorganic filler, etc. within an amount acceptable for the object of the present invention.

[2] Production Method

The microporous polyolefin membrane of the present invention may be produced as follows.

The polyolefin composition mentioned above is dissolved in a solvent under heating to prepare a solution. The solvent may be an aliphatic, alicyclic or aromatic hydrocarbon such as nonane, decane, decalin, p-xylene, undecane, dodecane, liquid paraffin, etc. and a mineral oil distillate having a boiling point comparable to those of the above hydrocarbons. The kinematic viscosity of the solvent is preferably 30 to 500 cSt, and more preferably 50 to 200 cSt when measured at 25° C. A kinematic viscosity less than 30 cSt at 25° C. prevents the polyolefin composition and the solvent from being uniformly kneaded or mixed and the resulting solution is unevenly extruded from a die. A solvent having a kinematic viscosity higher than 500 cSt is difficult to be removed from a sheet in the subsequent solvent removing step.

The polyolefin composition is dissolved in the solvent by stirring at a temperature which ensures a complete dissolution of the polyolefin composition in the solvent. Preferably, the polyolefin composition is at least a partially melted in an extruder, and then a solvent is added to and mechanically mixed with the polyolefin composition to form a solution at a temperature keeping the polyolefin composition at least partially melted. This method is advantageous as compared with a method where a solid polyolefin composition is dispersed in a solvent in the form of slurry, because the slurry needs to be continuously stirred to prevent the separation and sedimentation of the solid matter. Further, with the melt-dissolving method, the hopper can be reduced in its size as compared with the slurry-forming method. The temperature depends on the type of polymers in the polyolefin composition and the solvent used, and for example, 140° to 250° C. for a polyethylene-based polyolefin composition.

When the microporous membrane is produced from a highly concentrated solution of the polyolefin composition, the polyolefin composition is preferred to be dissolved in the solvent by a uniform melt-kneading in an extruder. In the melt-kneading, the polyolefin composition is melted in the extruder at an elevated temperature which is 30° to 100° C. higher than the melting point of the polyolefins in the polyolefin composition while the temperature depends on the type of the polyolefins. For example, the temperature is preferably 160° to 230° C., more preferably 170° to 200° C. for a polyethylene-based polyolefin composition, and preferably 190° to 270° C., more preferably 190° to 250° C. for a polypropylene-based polyolefin composition. After melting the polyolefin composition, a liquid solvent is added to the molten polyolefin composition and the mixture is kneaded in the extruder to obtain a solution.

The mixing ratio of the polyolefin composition and the solvent is 5 to 35% by weight, preferably 10 to 30% by weight for the polyolefin composition, and 65 to 95% by weight, preferably 70 to 90% by weight for the solvent, each based on the amount of the solution, namely the total amount of the polyolefin composition and the solvent. When the ratio of the polyolefin composition is less than 5% by weight (the ratio of the solvent exceeds 95% by weight), severe swell and neck-in occur at the die opening during the extrusion of the solution into the form of sheet, thereby failing to produce a self-supporting sheet. On the other hand, when the ratio of the polyolefin composition is more than 35% by weight (the ratio of the solvent is less than 65% by weight), an excessive shrinkage of the extruded sheet in the thickness direction reduces the porosity to fail to provide a microporous polyolefin membrane having a relatively large pore size, and additionally, the forming ability of the gel-like sheet is deteriorated. The permeability level of the final microporous polyolefin membrane can be controlled by changing the concentration of the solution within the above range.

Then, the solution of the polyolefin composition thus prepared in the extruder is directly extruded from the same extruder through a die, etc. in the form of sheet. The solution may be transferred into another extruder and extruded therefrom. Also, the solution may be, if desired, cooled and pelletized before the extrusion operation, and the pellets are remolten and extruded from an extruder. The thickness of the extruded sheet (extrudate) is preferably 10 to 300 µm so that the final microporous polyolefin membrane has a thickness of 5 to 250 µm, preferably 20 to 200 µm. When the thickness of the sheet is less than 10 µm, the strength of the gel-like sheet is so poor that a sound sheet-forming is difficult. On the other hand, when the thickness exceeds 300 µm, the gel-like sheet is less self-supporting and the resulting microporous polyolefin membrane has a low porosity and a small permeability. Also, the solvent is difficult to be removed from the sheet in the subsequent solvent removing step.

The extrusion is carried out usually through a sheet die having a rectangular orifice. A hollow die having a circular orifice, an inflation die, etc. may be also used. The die gap of the sheet die is usually 0.1 to 5 mm. The solution heated to 140° to 250° C. is extruded through a die lip into the form of gel-like sheet at an extrusion speed of preferably 20–30 cm/min to 15 m/min.

The gel-like sheet from the die lip is then immediately and rapidly cooled at a cooling speed of 50° C./min or more, preferably 100° to 100000° C./min to a crystallization temperature or below, preferably 90° C. or below, and more preferably 80° C. or below. By such a rapid cooling, a number of crystallites is formed in the sheet to cause the phase separation between the polyolefin composition and the solvent. The rapid cooling may be conducted by directly contacting the gel-like sheet with a cooling air, cooling water or other cooling media, or contacting the gel-like sheet with a surface of a chill roll cooled by a coolant. In the case of rapid cooling by the chill roll, for example, the gel-like sheet from the die lip is moved to the chill roll to contact with the surface thereof, thereby rapidly cooled to the crystallization temperature or below. Immediately after the contact with the chill roll, a frost line appears in the sheet due to the generation of crystallites. In the present invention, the cooling speed is expressed by the cooling from the die lip to the portion at which the frost line appears (frost line distance). Therefore, the frost line distance should be regulated so that the cooling speed specified above can be attained.

When the cooling speed is too small, the resultant sheet is likely to have closed-cell structure, thereby making the solvent removal difficult. When the cooling speed is higher than 10000° C./min, a dense cell-structure, which may result in a low permeability, is obtained.

The cooled sheet is washed with a solvent to remove the residual solvent therein, preferably without being subjected to a stretching process because the stretching may reduce the pore size to extremely lower the permeability of the resultant microporous polyolefin membrane. The washing solvent is a highly volatile solvent including hydrocarbons such as pentane, hexane, heptane, etc.; chlorinated hydrocarbons such as methylene chloride carbon tetrachloride, etc.; fluorinated hydrocarbons such as trifluoroethane, etc.; and ethers such as diethyl ether, dioxane, etc. These volatile solvents may be used individually or in combination, and selected according to the type of the solvent used to dissolve the polyolefin composition. Washing methods may include a method of extracting the residual solvent by immersing the cooled sheet in the washing solvent, a method of spraying the washing solvent on the surface of the cooled sheet or a combination thereof. The washing should be continued until the content of the residual solvent in the sheet becomes less than 1 weight %. Also, the washing temperature and the washing time may be selected so that such a removing ratio can be attained. Thereafter, the washing solvent is removed by drying under heating, air-drying, etc. to obtain the microporous polyolefin membrane of the present invention.

The dried product is preferably heat-set at a temperature between the crystal dispersion temperature and the melting temperature usually for 0.5 to 20 min, wherein the crystal dispersion temperature is a temperature at which the microbrawnian movement of polymer chains in the crystal region becomes activated and determined by measurement of dynamic viscoelasticity, and the melting point is a temperature at which polyolefins starts to change from crystalline state to liquid state and determined by a differential scanning calorimeter. Further, the resulting microporous polyolefin membrane is, if necessary, subjected to a hydrophilic treatment by plasma irradiation, impregnation with surfactant, surface grafting, etc.

The microporous polyolefin membrane with or without the heat-setting treatment and/or the hydrophilic treatment is taken-up on a winding reel. The take-up speed is not specifically limited as far as the properties of the taken-up membrane is within the specific ranges mentioned below.

The microporous polyolefin membrane thus produced has a high permeability as specified by an air permeability of 5 to 170 sec/100 cc, a porosity of 35 to 95%, an average through-pore diameter of 0.1 to 0.5 μm and a thickness of 5 to 250 μm.

The present invention will be further described while referring to the following Examples which should be considered to illustrate various preferred embodiments of the present invention.

Each property referred to in Examples were measured by the following methods:

(1) Membrane thickness: Determined from a cross sectional view of a microporous membrane by a scanning electron microscope.

(2) Porosity: Measured by a gravimetric method using the equation: porosity (%)=(1−density of sample membrane/density of starting material)×100.

(3) Air permeability: Measured according to JIS P8117.

(4) Average pore diameter: Measured by Coulter Porometer II manufactured by Nikkiso K. K.

(5) Gel-like sheet forming ability from solution: The occurrence of swell, neck-in and melt fracture, the uniformity of the extrusion amount and the smoothness of the sheet surface were observed by eye. The sheet forming ability was expressed by ○ when excellent in all the above items, by Δ when some of the items were poor, and by X when all or almost all the items were poor.

(6) Solvent removing from sheet: A translucent sheet of 100 mm×100 mm was immersed in a sufficient amount of methylene chloride for 5 minutes. When the residual solvent was completely removed, the sheen changed to white by irregular reflection. The sheet remained translucent when the solvent was not removed. The sheet changed to white was expressed by ○, the sheet partly remaining translucent was expressed by Δ, and the sheet remaining translucent was expressed by X.

EXAMPLE 1

A high density polyethylene (HDPE) having a weight average molecular weight (Mw) of $3.0 \times 10^5$ and an ultra high molecular weight polyethylene (UHMWPE) having a weight-average molecular weight (Mw) of $2.5 \times 10^6$ were blended in a weight ratio of 4/1 (HDPE/UHMWPE). An antioxidant was further added in an amount of 0.375 parts by weight per 100 parts by weight of the polyethylene mixture to obtain a polyethylene composition (Mw/Mn=14.2).

A mixture of 20 parts by weight of the polyethylene composition and 80 parts by weight of a liquid paraffin (135 cSt at 25° C.) was kneaded in a twin-screw extruder at 200° C. to prepare a uniform solution.

The solution was fed from the extruder to a long lip T-die (die lip gap: 0.6 mm) and extruded at 200° C. through the die lip into the form of a gel-like sheet of 150 μm thick at an extrusion speed of 3 m/min. Immediately after extruded from the T-die, the gel-like sheet was rapidly cooled to 40° C. at a cooling speed of 60° C./min by brought into contact with a chill roll surface cooled to about 40° C. The cooled sheet was washed with methylene chloride to remove the residual liquid paraffin by extraction. Then, the sheet was dried to remove the methylene chloride and heat-set at 115° C. to obtain a microporous polyethylene membrane of 121 μm. The properties of the microporous polyethylene (PE) membrane are shown in Table 1.

EXAMPLES 2–8 and COMPARATIVE EXAMPLES 1–6

Each microporous PE membrane was produced in the same manner as in Example 1 except for the following changes. The properties of each microporous PE membrane are shown in Table 2.

Example 2 Membrane thickness: 32 μm.

Example 3 Membrane thickness: 205 μm.

Example 4 Concentration of solution: 10% by weight.

Membrane thickness: 118 μm.

Example 5 Concentration of solution: 30% by weight.

Membrane thickness: 125 μm.

Example 6 HDPE/UHMWPE: ½ by weight.

Membrane thickness: 134 μm.

Example 7 HDPE/UHMWPE: 9/1 by weight.
Membrane thickness: 104 μm.
Example 8 Mw of UHMWPE: $5.0 \times 10^5$.
Membrane thickness: 119 μm.
Comparative Example 1 Biaxial stretching 5×5.
Comparative Example 2 Membrane thickness: 298 μm.
Comparative Example 3 Concentration of solution: 40% by weight.
Membrane thickness: 120 μm.
Comparative Example 4 No use of HDPE.
Membrane thickness: 130 μm.
Comparative Example 5 No use of UHMWPE.
Membrane thickness: 185 μm.
Comparative Example 6 Cooling speed: 30° C./min.
Membrane thickness: 42 μm.

TABLE 1

| | Examples | | | | | | | |
|---|---|---|---|---|---|---|---|---|
| | 1 | 2 | 3 | 4 | 5 | 6 | 7 | 8 |
| PE Composition | | | | | | | | |
| UHMWPE (Mw, × $10^5$) | 25 | 25 | 25 | 25 | 25 | 25 | 25 | 5 |
| HDPE (Mw, × $10^5$) | 3.0 | 3.0 | 3.0 | 3.0 | 3.0 | 3.0 | 3.0 | 3.0 |
| HDPE/UHMWPE by weight | 4 | 4 | 4 | 4 | 4 | 0.5 | 9 | 4 |
| Concentration of PE solution (wt %) | 20 | 20 | 20 | 10 | 30 | 20 | 20 | 20 |
| Sheet forming conditions | | | | | | | | |
| Cooling | rapid | rapid | rapid | rapid | rapid | rapid | rapid | rapid |
| Stretching | — | — | — | — | — | — | — | — |
| Sheet forming ability | ○ | ○ | ○ | ○ | ○ | ○ | ○ | ○ |
| Solvent removing | ○ | ○ | ○ | ○ | ○ | ○ | ○ | ○ |
| Properties of PE membrane | | | | | | | | |
| Thickness (μm) | 121 | 32 | 205 | 118 | 125 | 134 | 104 | 119 |
| Porosity (%) | 68 | 70 | 64 | 74 | 62 | 65 | 60 | 62 |
| Air permeability (sec/100 cc) | 82 | 20 | 108 | 50 | 105 | 99 | 147 | 152 |
| Average pore diameter (μm) | 0.342 | 0.452 | 0.218 | 0.379 | 0.205 | 0.310 | 0.273 | 0.250 |

TABLE 2

| | Comparative Examples | | | | | |
|---|---|---|---|---|---|---|
| | 1 | 2 | 3 | 4 | 5 | 6 |
| PE Composition | | | | | | |
| UHMWPE (Mw, × $10^5$) | 25 | 25 | 25 | 25 | — | 25 |
| HDPE(Mw, × $10^5$) | 3.0 | 3.0 | 3.0 | — | 3.0 | 3.0 |
| HDPE/UHMWPE by weight | 4 | 4 | 4 | — | — | 4 |
| Concentration of PE solution (wt %) | 20 | 20 | 40 | 20 | 20 | 20 |
| Sheet forming conditions | | | | | | |
| Cooling | rapid | rapid | rapid | rapid | rapid | slow |
| Stretching | 5 × 5 | — | — | — | — | — |
| Sheet forming ability | ○ | ○ | Δ | Δ to X | ○ | ○ |
| Solvent removing | ○ | Δ | X | ○ | Δ | X |
| Properties of PE membrane | | | | | | |
| Thickness (μm) | 30 | 298 | 120 | 130 | 185 | 42 |
| Porosity (%) | 41 | 58 | 30 | 60 | 53 | 16 |
| Air permeability (sec/100 cc) | 736 | 74900 | >$10^5$ | 155 | 2250 | >$10^5$ |
| Average pore diameter (μm) | <0.05 | <0.05 | <0.05 | 0.189 | 0.07 | <0.05 |

As described in detail, the microporous polyolefin membrane having a high permeability can be easily obtained by rapidly cooling the gel-like sheet formed from the solution of the polyolefin composition containing an ultra high molecular weight polyolefin, and subsequently removing the residual solvent.

What is claimed is:

1. A method of producing a microporous polyolefin membrane comprising:

dissolving a polyolefin composition in a solvent to prepare a solution comprising 5 to 35% by weight of said polyolefin composition and 65 to 90% by weight of said solvent, said polyolefin composition being a mixture of (A) an ultra high molecular weight polyolefin having a weight average molecular weight of $5 \times 10^5$ or more and (B) a polyolefin having a weight average molecular weight less than $5 \times 10^5$, and a weight ratio of (B)/(A) being 0.2 to 20;

extruding said solution through a die lip into a form of gel-like sheet;

rapidly cooling said gel-like sheet immediately after said extruding;

removing a residual solvent in the cooled sheet by a washing solvent; and drying the resultant sheet to remove said washing solvent to obtain said microporous polyolefin membrane.

2. The method according to claim 1, wherein said solution is extruded into the form of gel-like sheet having a thickness of 10 to 300 μm at a temperature of 140° to 250° C. under an extrusion speed of 20 cm/min to 15 m/min.

3. The method according to claim 1, wherein said gel-like sheet is rapidly cooled to a crystallization temperature or below at a cooling speed of 50° C./min or higher.

4. The method according to claim 1, wherein said microporous polyolefin membrane after drying is further subjected to a heat-setting treatment at a temperature between a crystal dispersion temperature and a melting temperature.

5. The method according to claim 1, wherein said microporous polyolefin membrane has an air permeability of 5 to 170 sec/100 cc, a porosity of 35 to 95%, an average through-pore diameter of 0.1 to 0.5 μm and a thickness of 5 to 250 μm.

* * * * *

UNITED STATES PATENT AND TRADEMARK OFFICE
CERTIFICATE OF CORRECTION

PATENT NO.   : 5,786,396
DATED        : July 28, 1998
INVENTOR(S)  : TAKITA et al It is certified that error(s) appears in the above-identified patent and that said Letters Patent is hereby corrected as shown below:

At column 6, line 43, change "60° C./min" to --60°C/sec--.

Signed and Sealed this

Third Day of November, 1998

Attest:

BRUCE LEHMAN

*Attesting Officer*   *Commissioner of Patents and Trademarks*